United States Patent [19]
Solis et al.

[11] Patent Number: 5,942,751
[45] Date of Patent: Aug. 24, 1999

[54] OPTICAL SHUTTER ENCODER SYSTEM FOR REPETITIVE DEVICE STATE CONDITION DETECTION

[76] Inventors: Ernesto Solis, Rio Tepalcatepec #1104, Las Aguilas, Guadalajara Jalisco; Miguel Alvarez, Navio 4843 J-6, La Calma, Guadalajara Jalisco; Marco A. Guerrero, Rafael Vaca 1649-D, Paseos del Sol, Guadalajara Jalisco, all of Mexico

[21] Appl. No.: 08/306,064

[22] Filed: Sep. 13, 1994

[51] Int. Cl.⁶ ..................................... G01D 5/34
[52] U.S. Cl. ................ 250/231.1; 250/231.18; 250/559.27
[58] Field of Search .............. 250/231.1, 231.18, 250/214 PR, 559.27, 559.22, 559.4, 229; 355/321, 322, 323; 271/258.01, 262, 9.03, 154, 155; 377/53; 33/501.9

[56] References Cited

U.S. PATENT DOCUMENTS

| | | | |
|---|---|---|---|
| 4,152,699 | 5/1979 | Sachsse | 250/229 |
| 4,379,968 | 4/1983 | Ely et al. | 250/229 |
| 4,524,347 | 6/1985 | Rogers | 250/231.18 |
| 4,637,264 | 1/1987 | Takahashi et al. | 250/231.1 |
| 5,036,191 | 7/1991 | Senoo | 250/229 |
| 5,328,169 | 7/1994 | Mandel | 250/559.4 |

*Primary Examiner*—Que T. Le

[57] ABSTRACT

An optical shutter encoder provides a mechanism for monitoring a state condition of an apparatus. A shutter assembly is adapted to have an aperture that varies with the changing state of the apparatus feature being monitored. An optical emitter and detector are provided to sample the condition of the shutter, that is, to determine if it is open, partially closed, or fully closed. The shutter condition is indicative of the state condition. A series of encoders is provided to monitor repetitive devices of the apparatus; the emitter and detector pair are moved to sequentially sample each shutter, thus providing the state condition of each repetitive device of the apparatus.

12 Claims, 4 Drawing Sheets

OPTICAL SHUTTER ENCODER SYSTEM FOR REPETITIVE DEVICE STATE CONDITION DETECTION

FIELD OF THE INVENTION

The present invention relates generally to techniques for controlling the operation or position of a mechanism of a mechanical or electromechanical device and, more particularly, to encoders for detecting position or mechanical state condition.

BACKGROUND OF THE INVENTION

Generally, it is known in the art that incremental position encoders are of two common types, linear and rotary.

The linear type of encoder, for example as disclosed in U.S. Pat. Nos. 2,848,698 and 3,245,144, senses increments of position along the axis of freedom as well as the limits of movement. A linear scale is provided and the encoder resolves scale divisions in the axis upon the occurrence of relative movement between the encoder body and the scale.

The rotary type of encoder, such as taught in U.S. Pat. No. 3,262,105, does not measure or sense increments of position directly along an axis. It has a rotatable circular scale which is driven by a screw (or the motor which drives the screw) which, for example, drives a carriage in an axis. The rotary encoder then senses increments of angular displacement of the scale measured on the periphery of the scale rotor as well as revolutions of the scale.

Linear encoders have found application in printer technology, such as disclosed in U.S. Pat. Nos. 4,786,803 and 4,789,874 by Majette et al. for a single channel encoder system for controlling the position, velocity and direction of a media scanning printhead.

Thus, encoders known in the art are relatively complex in that the functions for which they are employed often require a scale member. Yet, encoders also may be useful for the determination of a digital state condition. For example, a digital state condition detection is useful to detect a "PAPER FULL" condition in a collating or sorting unit in hard copy production, such as computer printers and electrophotography copiers. Furthermore, network printing is stressing the need for unattended printing processes. Devices for this type of state condition sensing can be critical to system operations and management.

Therefore, there is a need for improvement in the field of encoders.

SUMMARY OF THE INVENTION

In its basic aspects, the present invention presents an encoder system, having optoelectronics for transmitting and sensing a light beam, at least one shutter mechanism, adapted to cooperate with the optoelectronics to selectively interrupt the light beam, and a moving apparatus for selectively engaging and disengaging the optoelectronics and shutter mechanism.

It is an advantage of the present invention that it provides an encoder of simplified design and method of operation.

It is another advantage of the present invention that it provides a wide operational domain, reducing positional tolerance design requirements.

It is still another advantage of the present invention that sensing accuracy is not dependent upon the accuracy of a sensor device's positioning.

It is a further advantage of the present invention that it provides an adjustable encoding device.

It is yet another advantage of the present invention that it has a low manufacturing cost.

Other objects, features and advantages of the present invention will become apparent upon consideration of the following detailed description and the accompanying drawings, in which like reference designations represent like features throughout the FIGURES.

BRIEF DESCRIPTION OF THE DRAWINGS

FIG. 1 is a plan view (side) drawing of the present invention in which:

FIG. 1A depicts aperture plates in a fully aligned position;

FIG. 1B depicts aperture plates in a partially overlapping position (with shading reversal to demonstrate functionality); and FIG. 1C depicts aperture plates in a fully misaligned position.

FIG. 3 is a drawing of alternative aperture encoding patterns for the present invention as shown in FIG. 2 wherein:

FIG. 4 is a drawing of another alternative aperture encoding pattern for the present invention as shown in FIG. 2 wherein:

FIG. 5 is a schematic plan view (side) of the present invention as in operation wherein:

The drawings referred to in this description should be understood as not being drawn to scale except if specifically noted.

DETAILED DESCRIPTION OF THE INVENTION

Reference is made now in detail to a specific embodiment of the present invention, which illustrates the best mode presently contemplated by the inventor(s) for practicing the invention. Alternative embodiments are also briefly described as applicable.

Figure 1:
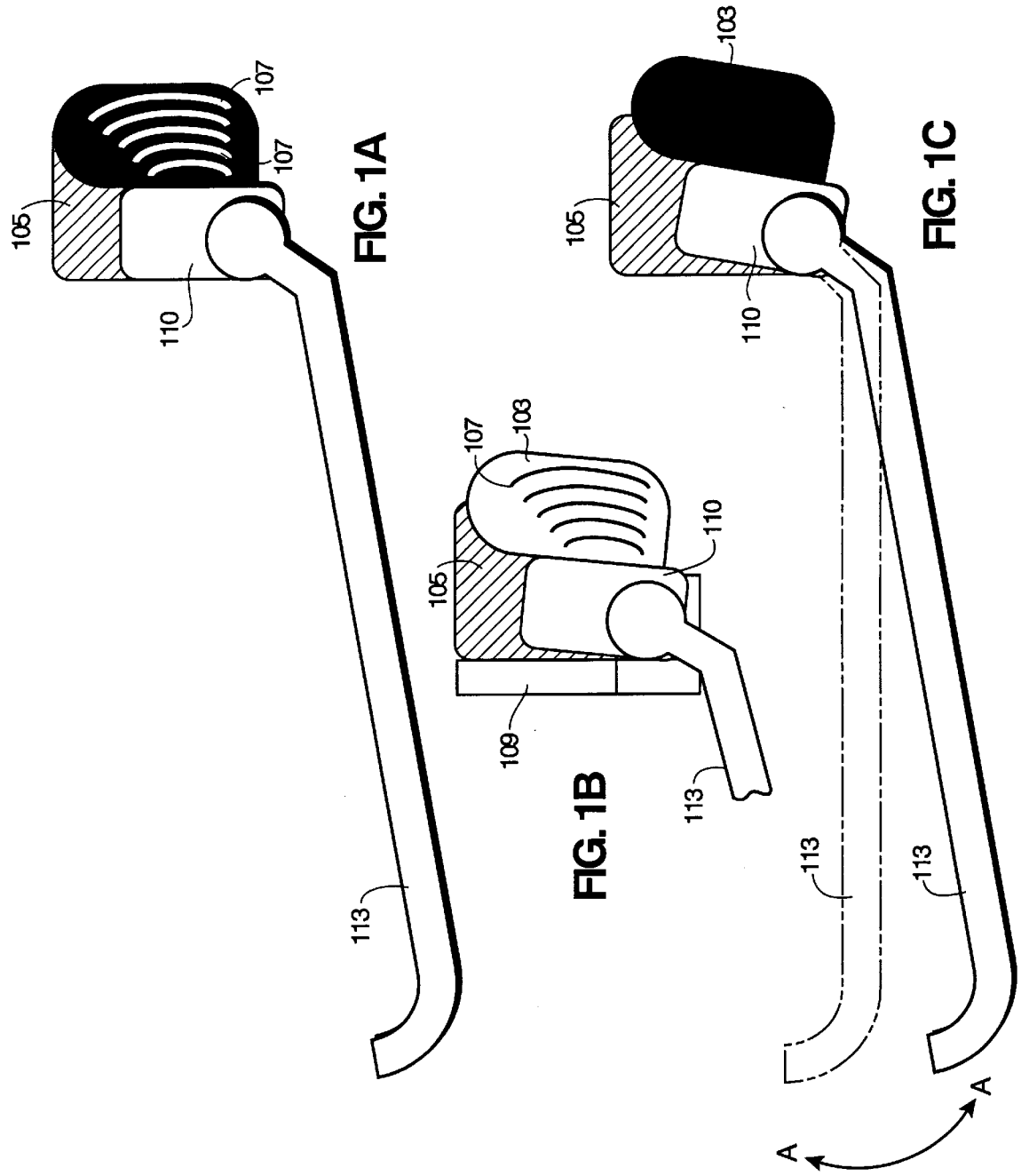

Referring to FIG. 1, a shutter mechanism 101 is provided. The shutter mechanism 101 includes two parallel plates 103, 105. For convenience of demonstration only, in FIGS. 1 A and 1 B, the front plate 103 is shown in black shading and the rear plate 105 in striped shading. Alignment is shown more particularly in FIG. 2. Each plate 103, 105 bears substantially identical aperture slits 107. As shown in FIG. 1A, when the parallel plates 103, 105 are fully aligned, the shutter mechanism 101 has its aperture fully open. As shown in FIG. 1B (with shading reversal, using exaggerated black edge lines to illustrate the apertures 107), the shutter mechanism 101 aperture is changing in size due to variable aligned and misaligned positions of the parallel plates 103, 105; that is, as in FIG. 1B "HALF OPEN," or partially misaligned aperture slits 107. As shown in FIG. 1 C, when the parallel plates 103, 105 are fully misaligned, the shutter mechanism 101 has its aperture fully closed. An aperture actuator arm 113 is provided as described in detail with respect to FIG. 2.

Figure 2:
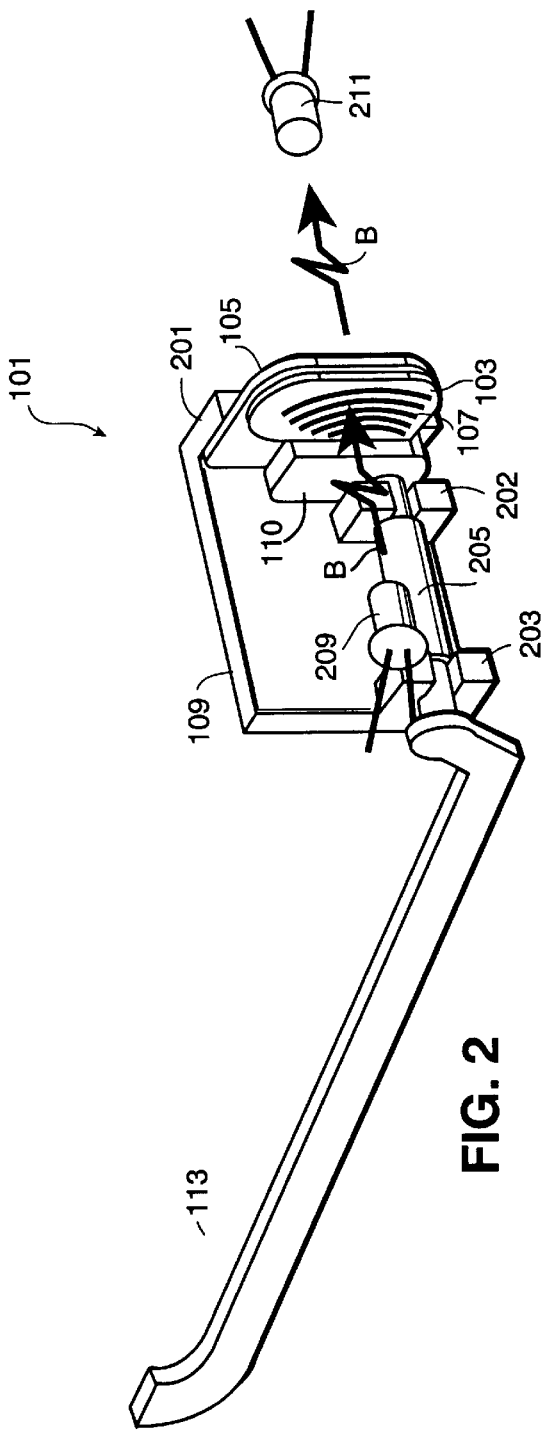
FIG. 2 is a perspective view drawing of a preferred embodiment of the present invention as shown in FIG. 1, shown with a cooperative optoelectronic device.

Referring now to FIG. 2, a complete shutter mechanism 101 is depicted in conjunction with components of a light activated switching device. A light beam is represented by arrows labelled "B." The first shutter plate 103 is mounted with respect to a mounting bracket member 109 on a movable shutter frame member 110. The second shutter plate 105 is fixedly mounted to the bracket member 109. That is, first shutter plate 103 is mounted for substantially parallel movement relative to said second shutter plate 105.

Bracket member 109, for example, a metal or plastic bracket, is adapted to be fixed to a frame of a machine such as a hard copy device (not shown) in which the optical shutter encoder of the present invention is to be employed. The bracket member 109 includes a substantially perpendicular first extension portion 201 at one end. The second shutter plate 105 is fixedly mounted thereon, attached to the first extension portion 201 in any suitable manner as would be known in the art, provided that the mounting does not block the apertures 107 of the shutter plate 103. At the opposite end of the bracket member 109 from said first extension portion 201 is a second extension portion 203 of the bracket member 109. The second extension portion 203 is substantially parallel to the first extension portion 201. A third extension portion 202 of the bracket member 109, also substantially parallel to the first extension portion 201 and the second extension portion 203, is adjacent the movable shutter frame member 110. The second and third extension portions 202, 203 of bracket member 109 are designed to bear a rotatable connector rod 205 therethrough, allowing the connector rod 205 to freely rotate about its center axis. The connector rod 205 protrudes slightly from the second extension portion 203 at its proximate end and extends to a fixed attachment position on the movable shutter frame member 110 at its distal end, adapted suitably for rotation. Thus, the shutter frame member 110 with the moveable shutter plate 103 is fixed to the connector rod 205 at its distal end.

It will now be recognized that the fixed shutter plate 105 and the moveable shutter plate 103 are positioned adjacently in parallel planes, substantially perpendicular with respect to the bracket member 109. That is, the fixed shutter plate 105 is stationary with respect to bracket member 109; the parallel, movable shutter plate 103 is free to move in an angular rotational motion based upon rotation of the connector rod 205.

An actuator arm 113 is fixed to the proximate end of the connector rod 205 for providing rotational movement that is translated to the moveable shutter plate 103 as shown in FIG. 1C as arrow A—A.

As will be recognized by a person skilled in the art, this shutter plate mounting is exemplary of many different adaptations that could be employed to arrange the aperture plates in parallel for operation in accordance with the scope of the present invention.

Referring back to FIGS. 1A, 1B and 1C, the apertures 107 of the parallel plates 103, 105 being substantially identical, act as a selectively changeable shutter mechanism when the moveable plate 103 is moved in accordance with motion of the actuator arm 113. That is, the relative movement of the moveable shutter plate 103 with respect to the fixed shutter plate 103 opens and closes the shutter mechanism such that light is passed or blocked by both plates depending upon the relative position of the two plates. Comparing FIGS. 1A, 1B and 1C, it will be noted that as the actuator arm 113 provides rotation to the connector rod 205, the moveable shutter plate 103 mounted on the connector rod 205 changes relative position with respect to the fixed shutter plate 105. As the relative position changes, the aligned apertures 107 of the plates, as shown in FIG. 1A, begin to get misaligned, as depicted in FIG. 1B, thereby partially closing the shutter. At some degree of predetermined rotation, the apertures 107 become fully misaligned, as shown in FIG. 1C; that is, the shutter is closed and no light passes through.

Figure 3A:
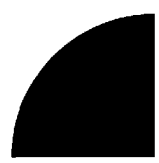
FIG. 3A is a depiction of an encoding pattern for a fully open optical shutter mechanism.
Figure 3B:
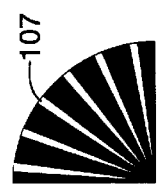
FIG. 3B is a depiction of an encoding pattern for a partially closed optical shutter mechanism.
Figure 3C:
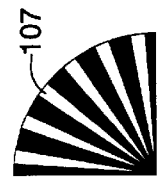
FIG. 3C is a depiction of an encoding pattern for a fully closed optical shutter mechanism.
Figure 4A:
FIG. 4A is a depiction of an encoding pattern for a fully open optical shutter mechanism.
Figure 4B:
FIG. 4B is a depiction of an encoding pattern for a partially closed optical shutter mechanism.
Figure 4C:
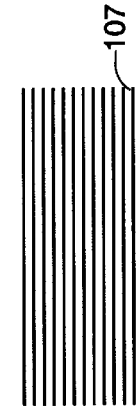
FIG. 4C is a depiction of an encoding pattern for a fully closed optical shutter mechanism.

Other exemplary aperture patterns in accordance with the present invention are shown in FIGS. 3 and 4. The example of FIG. 3A (Fully Open Shutter), 3B (Partially Closed Shutter), and FIG. 3C (Fully Closed Shutter) lends itself to a radial rotation mechanism such as a screw mount. The example of FIG. 4A (Fully Open Shutter), 4B (Partially Closed Shutter), and FIG. 4C (Fully Closed Shutter)—sometimes referred to as a "curtain shutter"—lends itself to a linear motion mechanism as may be designed in accordance with the scope of the present invention. Other aperture patterns which operate in the describe manner under relative motion may also be designed in accordance with the scope of the present invention.

The shutter mechanism 101 is used in conjunction with an optoelectronic device to provide encoder type information. Referring again to FIG. 2, an exemplary H-type opto-switch is shown. Such switches, also known as optointerrupters, are commercially available, such as the model H21A or H22A series by Quality Technologies, Sunnyvale, Calif. In essence, the H-type opto-switch has a light emitter 209 and a facing light detector 211. The switch toggles between ON and OFF depending upon whether the light beam is broken between the emitter 209 and the detector 211. Thus, the switch can be used as a digital signal device, providing a "1" (HIGH) and "0" (LOW) state depending upon whether the detector 211 is receiving light from the emitter 209.

The shutter plates 103, 105 of the shutter mechanism 101 are placed between the emitter 209 and detector 211. When the apertures 107 are in any position (FIGS. 1A, 1B, 3A, 3B, 4A, 4B) except fully misaligned (FIGS. 1C, 3C, 4C), light from the emitter 209 can pass through the shutter plate apertures 107 to the detector 211 of the opto-switch, thus providing a first signal, e.g., a "1." As the moveable plate 103 is shifted to where the apertures 107 are fully misaligned (see e.g., FIGS. 1C, 3C, and 4C), no light is able to pass through the shutter mechanism 101 from the emitter 209 to the detector 211 and the opto-switch provides a second signal, e.g., a "0." Thus, the optoelectronic device can be used to provide a signal indicative of a mechanical state condition.

Figure 5A:
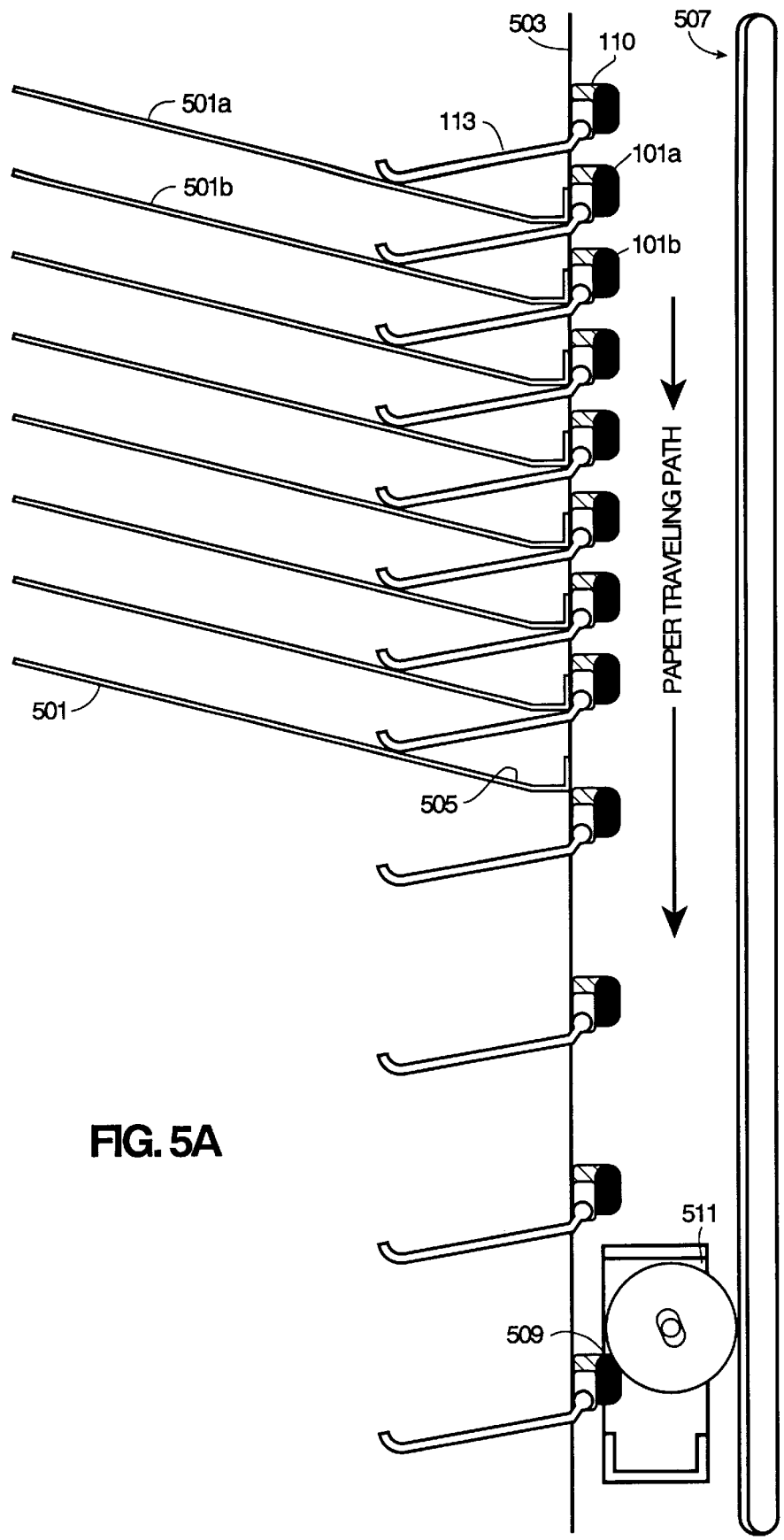
FIG. 5A is a schematic plan view (side) of a print media sorting mechanism.
Figure 5B:
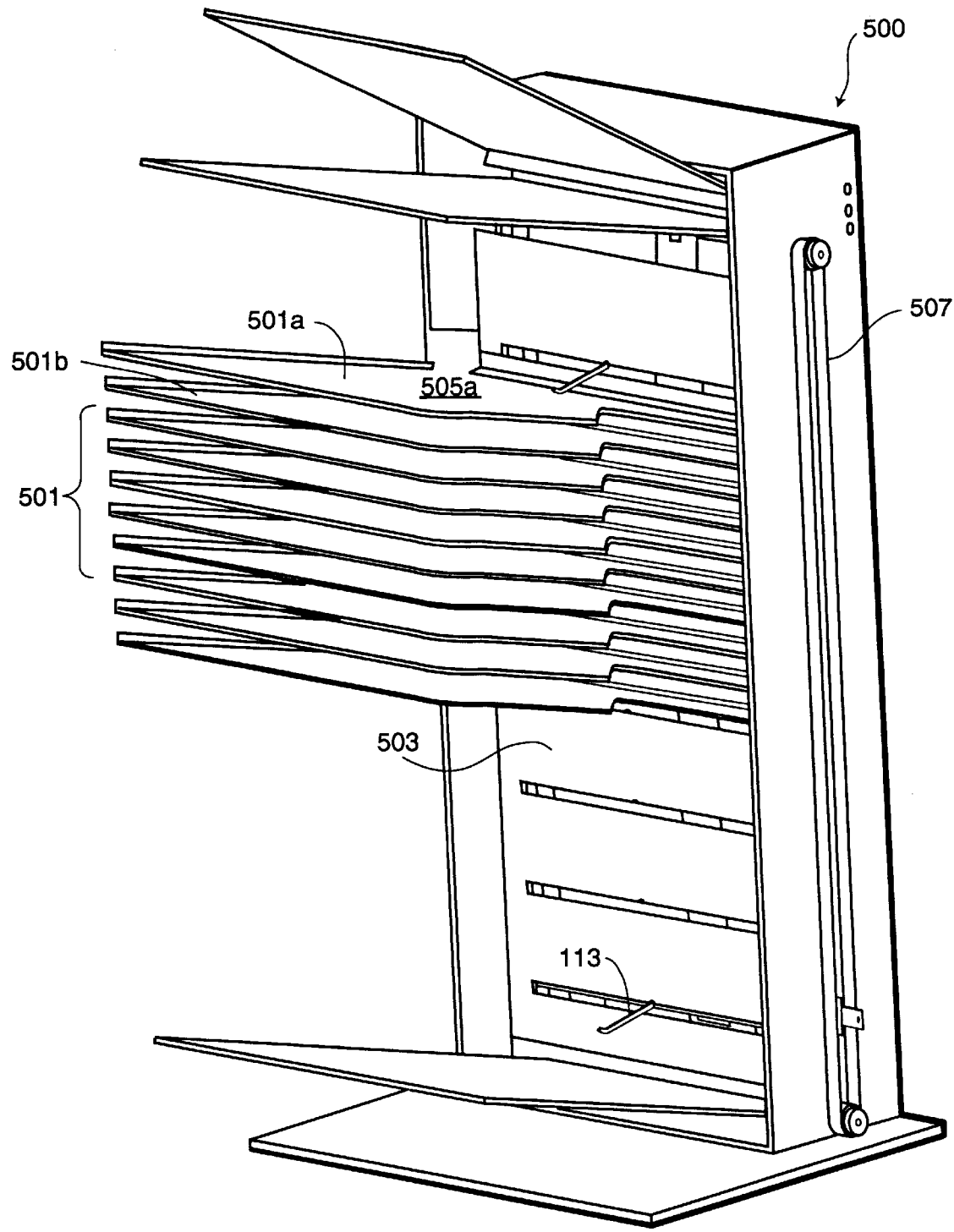
FIG. 5B is a perspective view of the print media sorting mechanism as shown in FIG. 5A.

The present invention is particularly useful in a machine where repetitive devices need to be sampled to determine their status. An exemplary use of the present invention is shown in FIGS. 5A and 5B. In a hard copy producing machine, such as a collating computer printer system or a sorting/stacking mechanism 500 of a photocopier, a plurality of print media trays 501 are generally provided. Cut sheets of print media are delivered (see arrow designated "Paper Traveling Path" in FIG. 5A) to an appropriate pick mechanism (not shown) for delivering individual printed sheets to the trays 501. As such trays have an inherent capacity limitation, it is necessary to provide a method for determining when a tray is filled to its capacity.

A shutter mechanism 101*a*, 101*b*, et seq., in accordance with the present invention is mounted to cooperate with each tray 501*a*, 501*b*, et seq., respectively. The bracket member 109 is suitably fixed to a wall 503 of the hard copy machine adjacent each tray 501 such that the actuator arm 113 of the shutter mechanism 101 rests on the tray surface 505 that receives individual print media sheets. In this position, the apertures 107 of the shutter plates 103, 103 are aligned; thus the shutter is fully open.

The optoelectronic switching device 509 is fixedly mounted to a carriage 511 that rides on a belt 507 in an endless-loop or a reversible back-and-forth manner. The travel of the optoelectronic device 509 is such that as the belt 507 moves, the emitter 209 and detector 211 pair is brought into sequential operable engagement with each shutter mechanism 101 as previously described. That is, the optoelectronic device 509 is moved from a shutter mechanism 101*a* of a first tray 501*a* to shutter mechanism 101*b* of a second tray 501*b*, and so on along the path of the carriage 511, with the emitter 209 and detector 211 pair gap being transected sequentially by each shutter mechanism set of aperture plates at each tray.

As sheets of print media stack up on a tray 501, the actuator arm 113 is raised proportionately to the height of the stack. When the stack reaches a predetermined height, that is, the tray is full, the actuator arm 113 has rotated to a predetermined position such that the shutter mechanism 101 is closed. Upon the next pass of the optoelectronic device, the beam of light from the emitter 209 to the detector 211 is broken by the closed shutter. An output signal from the detector 211 changes from HIGH to LOW, indicating that the tray 501 is full.

Note that in an alternative embodiment (not shown), the encoder apparatus described can be converted to an analog device by substituting a photovoltaic device for the optoswitch. That is, the emitter 209 can be a broad beam light source that illuminates the entire array of the photovoltaic device when the shutter mechanism is fully open. As the shutter mechanism closes incrementally, less of the photovoltaic device is illuminated and, therefore, its output decreases linearly. In such an embodiment, the present invention can be used to monitor incremental changes in the state condition of a device. As in the prior example, the invention could be used to count the number of copies in each collator tray.

As in the preferred embodiment described, it will be noted that by having the shutter mechanism operate transversely to the light beam from the emitter 209 to the detector 211 that mechanical tolerances are relieved. The encoding surfaces give the same effect as when a person is viewing through a window that has a venetian blind partially open. If the person is standing in a parallel plane to the blind's movement, no matter its location in that particular plane, the amount of light (sensing area) that person is able to see through the window is exactly the same. In the same manner, the concept of the present invention, having a wide operational sensing area defined by the parallel apertures of the aperture plates, reduces the positioning tolerance requirements of the optoelectronic device in relation to the shutter mechanism.

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application to thereby enable others skilled in the art to understand the invention for various embodiments and with various modifications as are suited to the particular use contemplated. It is intended that the scope of the invention be defined by the claims appended hereto and their equivalents.

What is claimed is:

1. An encoder apparatus for monitoring state conditions of a plurality of devices, comprising:

an optical assembly, having
an optical emitter, and
an optical detector, mounted in operable cooperation with said emitter,
said emitter and detector defining a gap therebetween; and each of said plurality of devices is provided with
a shutter assembly, adapted to cooperate with said optical assembly, having
a first aperture plate, having a set of apertures therethrough, and
a second aperture plate mounted adjacently said first aperture plate thereon in a plane parallel to said first aperture plate, having a set of apertures therethrough substantially identical to said first aperture plate set of apertures,
said first and second aperture plate being adapted for relative motion to each other such that said sets of apertures move selectively from an aligned position, where light from said emitter passes through said sets of apertures to said detector, to a misaligned position, where light from said emitter is blocked by said misaligned plates from being transmitted to said detector; and
a carriage assembly, said optical assembly being fixedly mounted thereon for relative motion with respect to each of said shutter assemblies such that each said shutter assembly selectively passes through the gap defined between said optical emitter and optical detector.

2. The apparatus as set forth in claim 1, further comprising:

means for fixedly mounting said first aperture plate with respect to said device;
means, coupled to said second aperture plate, for providing said relative motion by moving said second aperture plate with respect to said first aperture plate in response to a changing state condition of said device.

3. The apparatus as set forth in claim 2, wherein the aperture opening provided by said first aperture plate and said second aperture plate changes incrementally as said means for providing said relative motion moves said second aperture plate.

4. The apparatus as set forth in claim 3, wherein said detector further comprises:

a means for detecting the relative intensity of light from said emitter and transmitting a signal indicative of said intensity of light.

5. The apparatus as set forth in claim 2, wherein said detector further comprises:

means for transmitting a first signal indicative of a first state condition of said device upon detection of any light from said emitter through said first and second aperture plates and a second signal indicative of a second state condition of said device when no light from said emitter is received through said first and second aperture plates.

6. The apparatus as set forth in claim 1, wherein said apparatus further comprises:

a plurality of said shutter assemblies fixedly mounted in a series configuration such that each said shutter assembly is sequentially sampled by said optical assembly during said motion of said carriage assembly.

7. A digital encoder system for determining the status of a series of repetitive, cut sheet media trays having predetermined capacity state conditions, comprising:

a carriage mechanism;

an optical emitter and detector pair, cooperatively mounted in a fixed relationship on said carriage mechanism to define a gap between said emitter and said detector, said detector including means for transmitting a signal indicative of reception of light from said emitter;

a plurality of shutter means, each mounted on one of said trays, respectively, each shutter means including a first aperture plate, having a set of apertures therethrough, fixedly mounted on each of said trays, a second aperture plate, substantially identical to said first aperture plate, having a substantially identical set of apertures therethrough, mounted on each of said trays in a parallel orientation to said first aperture plate and adapted to move in a parallel manner with respect said first aperture plate, and means, fixedly coupled to said second aperture plate, for incremental moving said second aperture plate in accordance with said capacity state condition of each of said trays from a first position wherein said sets of apertures are in substantially full alignment to a second position wherein said sets of apertures are fully misaligned;

wherein said carriage mechanism sequentially moves said optical emitter and detector pair to each of said trays such that said shutter means is oriented in said gap to obstruct light from said emitter when said shutter is closed and to pass light from said emitter to said detector when said shutter means is at least partially open, said signal from said means for transmitting a signal being indicative of the capacity state condition of each said trays based upon the position of said second aperture plate, whereby said capacity state condition of each of said trays is determined.

8. The system as set forth in claim 7, wherein said set of apertures in said first and second aperture plates further comprises:

aperture slits adapted for changing aperture opening due to linear relative motion by said first and second aperture plates.

9. The system as set forth in claim 7, wherein said set of apertures in said first and second aperture plates further comprises:

aperture slits adapted for changing aperture opening due to radial relative motion by said first and second aperture plates.

10. The system as set forth in claim 7, wherein said set of apertures in said first and second aperture plates further comprises:

aperture slits adapted for changing aperture opening due to spiral relative motion by said first and second aperture plates.

11. The system as set forth in claim 7, wherein said optical emitter and detector pair further comprises:

an opto-switch providing a first digital signal when said shutter means is in said first position or any transitional position to said second position and a second digital signal when said shutter is in said second position.

12. The system as set forth in claim 7, wherein said optical emitter and detector pair further comprises:

a light source and a photovoltaic detector arranged such that said photovoltaic detector provides a signal indicative of the relative position of said first and second aperture plates as said second aperture plate moves from said first position to said second position.

* * * * *